Figures 1, 2, 3:
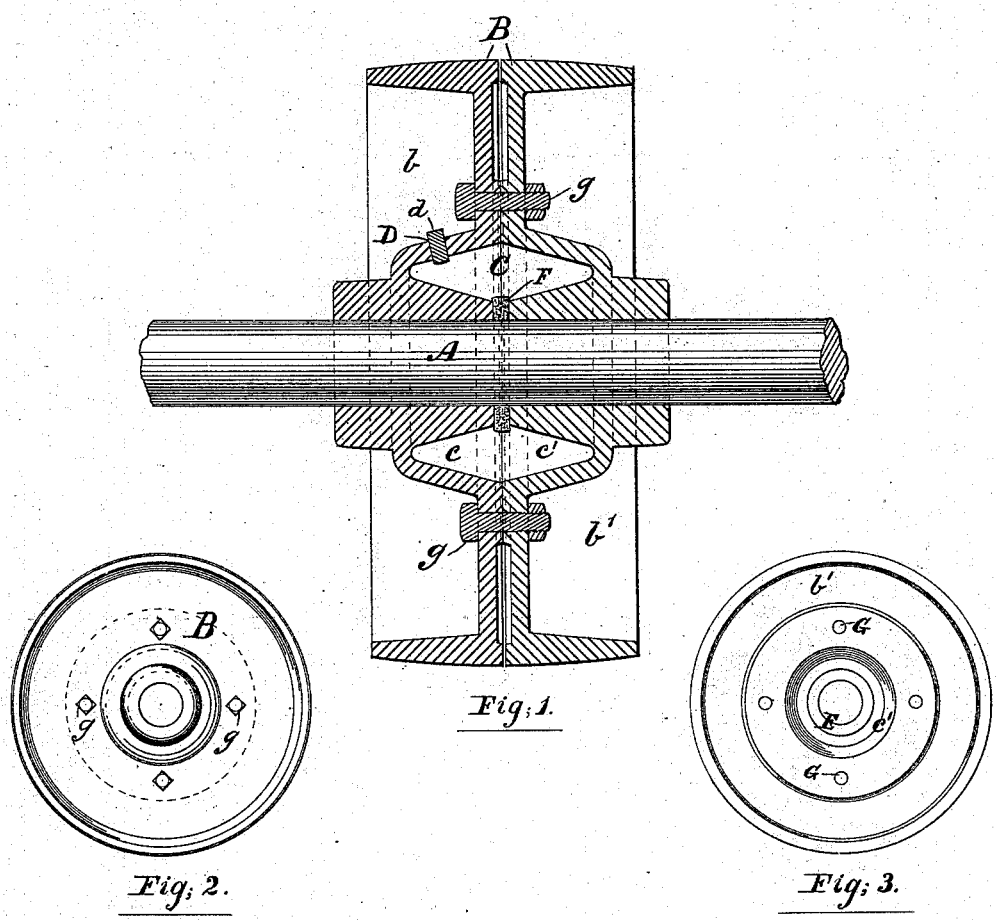

(No Model.)

E. F. GORDON.
SELF LUBRICATING LOOSE PULLEY.

No. 295,999. Patented Apr. 1, 1884.

Witnesses.
Frank A. Merrill
A. M. Long

Inventor
E. F. Gordon
per. J. B. Thurston
Attorney.

UNITED STATES PATENT OFFICE.

EDWARD F. GORDON, OF CONCORD, NEW HAMPSHIRE, ASSIGNOR OF ONE-HALF TO HORATIO HOBBS, OF SAME PLACE.

SELF-LUBRICATING LOOSE PULLEY.

SPECIFICATION forming part of Letters Patent No. 295,999, dated April 1, 1884.

Application filed October 8, 1883. (No model.)

*To all whom it may concern:*

Be it known that I, EDWARD F. GORDON, a citizen of the United States, residing at Concord, in the county of Merrimac and State of New Hampshire, have invented a new and Improved Self-Lubricating Loose Pulley; and I hereby declare the following to be a full and exact description thereof.

The object I have in view is to provide an oil chamber or reservoir in a pulley running loose on a shaft, in so simple a manner as that the trifling additional cost of manufacture over and above the cost of an ordinary loose pulley may prove no hinderance to its popular use.

In order to clearly show of what my improvements consist, as well as the construction of my improved pulley, I will here refer to the accompanying drawings, forming part of this specification, in which similar letters of reference indicate similar parts in all the figures, of which—

Figure 1 is a vertical section of the improved pulley composed of two like parts bolted together and mounted upon a shaft. (Shown in elevation.) Fig. 2 represents a reduced side elevation of the same, as when removed from the shaft. Fig. 3 shows an inner side elevation of one of the parts, showing the hole for shaft, holes for the bolts, and the recess forming half of the annular oil-chamber.

A is a section of a counter-shaft upon which the loose pulley B, formed of the parts $b$ $b'$, is mounted.

C is the annular oil-chamber.

D is a hole through which the oil is introduced into the oil-chamber.

$d$ represents a plug for closing the same.

E is an annular slot connecting said oil-chamber with the shaft.

F is a washer, the purpose of which will be hereinafter described.

The holes G are placed in each of the parts $b$ $b'$ of the pulley B, and receive the bolts $g$, which clamp said parts together.

My improved pulley is made in two parts, both of which are cast from the same pattern, and for the purpose of economy in manufacture the surface of contact one with the other is confined wholly to a small portion immediately surrounding the oil-chamber C; and it is through these surfaces that the holes G are made.

In each of the parts $b$ $b'$ are recesses $c$ $c'$, having sloping sides, which meet each other at the proper depth and form an acute angle. When the parts $b$ $b'$ are bolted together, these recesses $c$ $c'$ are opposite to each other, and thus compose the oil-chamber C, the form of which, if the interior lines were seen in cross-section, would be that of a rhombus. The annular slot E connects the inner obtuse angle of the said oil-chamber with the shaft, and a collar or washer, F, composed of any suitable porous material, is placed on the shaft A, at either side of which is also placed thereon the parts $b$ $b'$ of the pulley B. Then, by means of the bolts $g$, said washer is subjected to a severe pressure, and is clamped between the two parts $b$ $b'$ and within the slot E until the said parts $b$ $b'$ come in contact.

One great difficulty to overcome in the construction of self-lubricating pulleys is their tendency to throw oil while running loose upon a shaft. This characteristic I have endeavored to avoid in the pulley herein described.

From the action of centrifugal force the majority of the oil contained in the chamber C will keep toward the outside of said chamber and away from the porous conductor or washer F while the improved pulley is running on the shaft, but while the pulley remains quiet, (as over night, for instance,) the conductor or washer F is being saturated with oil. Therefore in my pulley I depend almost entirely upon the absorbing qualities of the conductor or collar F for its proper lubrication.

I am aware that washers of various kinds, resting loosely within the hub of a pulley, and surrounding the shaft, have been previously used and patented. I therefore disclaim the use of a loose washer; but—

What I do claim, and desire to secure by Letters Patent of the United States, is—

In a self-lubricating loose pulley, B, the central porous washer, F, clamped between the sections $b$ $b'$, for the purpose of conducting oil from the chamber C to the shaft, substantially as and in the manner described and set forth.

EDWARD F. GORDON.

Witnesses:
J. B. THURSTON,
NATHL. E. MARTIN.